United States Patent
El-Beltagy et al.

(10) Patent No.: US 8,898,327 B2
(45) Date of Patent: Nov. 25, 2014

(54) METHOD AND DEVICE FOR ARRANGING PEERS IN A LIVE STREAMING P2P NETWORK

(75) Inventors: Mohammed El-Beltagy, Stockholm (SE); Amgad Naiem, Stockholm (SE); Fouad Essayadi, Stockholm (SE)

(73) Assignee: Peerialism AB, Stocksund (SE)

( * ) Notice: Subject to any disclaimer, the term of this patent is extended or adjusted under 35 U.S.C. 154(b) by 0 days.

(21) Appl. No.: 13/253,302

(22) Filed: Oct. 5, 2011

(65) Prior Publication Data

US 2013/0091294 A1    Apr. 11, 2013

(51) Int. Cl.
*G06F 15/16* (2006.01)
*H04L 29/08* (2006.01)

(52) U.S. Cl.
CPC .................... *H04L 67/1046* (2013.01)
USPC ........................................................ 709/231

(58) Field of Classification Search
CPC ................... H04L 29/06027; H04L 29/06462; H04L 29/06
USPC ........................................................ 709/231
See application file for complete search history.

(56) References Cited

U.S. PATENT DOCUMENTS

| | | | |
|---|---|---|---|
| 6,065,062 A | 5/2000 | Periasamy et al. | |
| 6,304,980 B1 | 10/2001 | Beardsley et al. | |
| 6,715,005 B1 * | 3/2004 | Rodriguez et al. | 710/41 |
| 7,630,370 B2 * | 12/2009 | Deshpande et al. | 370/390 |
| 7,698,460 B2 * | 4/2010 | Zhang et al. | 709/238 |
| 7,975,282 B2 * | 7/2011 | Deshpande et al. | 725/93 |
| 7,978,631 B1 | 7/2011 | Abdelaziz et al. | |
| 7,996,547 B2 | 8/2011 | Sudhakar | |
| 8,037,023 B2 | 10/2011 | Liu et al. | |
| 2004/0034791 A1 | 2/2004 | Savathphoune | |
| 2004/0143672 A1 | 7/2004 | Padmanabham et al. | |
| 2005/0044147 A1 | 2/2005 | Yap | |
| 2006/0190615 A1 * | 8/2006 | Panwar et al. | 709/231 |
| 2006/0259607 A1 | 11/2006 | O'Neal et al. | |
| 2007/0140110 A1 | 6/2007 | Kaler | |
| 2008/0037527 A1 | 2/2008 | Chan et al. | |
| 2008/0155120 A1 * | 6/2008 | Argawal et al. | 709/242 |
| 2008/0205291 A1 * | 8/2008 | Li et al. | 370/254 |

(Continued)

OTHER PUBLICATIONS

Roverso, Roberto, et al. (Sep. 2012). Peer2View: A peer-to-peer HTTP-live streaming platform. In Peer-to-Peer Computing (P2P), 2012 IEEE 12th International Conference on (pp. 65-66). IEEE.*

(Continued)

*Primary Examiner* — Lynn Feild
*Assistant Examiner* — Timothy Sowa
(74) *Attorney, Agent, or Firm* — Myers Bigel Sibley & Sajovec, P.A.

(57) ABSTRACT

The present invention relates to a method and device for arranging peers in a P2P network. To this end, a request is received from a peer entering the network to receive data content. Thereafter, a latency is determined with which the entering peer is to receive the data content with respect to a real-time playback point of the data content distributed by the streaming source. After the latency has been determined, the entering peer is provided with a plurality of randomly selected peers from which the requested data content can be downloaded with an expected probability depending on the determined latency. Thus, the entering peer is enabled to download, with the expected probability, the requested data content from a selected one of the randomly selected peers having a lower latency than that determined for the entering peer.

26 Claims, 9 Drawing Sheets

(56) References Cited

U.S. PATENT DOCUMENTS

| | | |
|---|---|---|
| 2008/0263208 A1 | 10/2008 | White |
| 2008/0294779 A1 | 11/2008 | Gkantsidis et al. |
| 2008/0317028 A1 | 12/2008 | Chockler et al. |
| 2009/0043893 A1 | 2/2009 | Pendarakis et al. |
| 2009/0106802 A1 | 4/2009 | Zuckerman et al. |
| 2009/0119265 A1 | 5/2009 | Chou et al. |
| 2009/0119734 A1 | 5/2009 | Deshpande et al. |
| 2009/0154476 A1 | 6/2009 | Kobara |
| 2009/0164576 A1 | 6/2009 | Noh et al. |
| 2009/0177792 A1* | 7/2009 | Guo et al. ............ 709/231 |
| 2009/0234917 A1 | 9/2009 | Despotovic et al. |
| 2009/0323700 A1 | 12/2009 | Schwan et al. |
| 2010/0014528 A1 | 1/2010 | Amir et al. |
| 2010/0049869 A1 | 2/2010 | Jayaram et al. |
| 2010/0064049 A1* | 3/2010 | Magharei et al. ........ 709/229 |
| 2010/0098103 A1 | 4/2010 | Xiong et al. |
| 2010/0146053 A1 | 6/2010 | Jiang |
| 2010/0146092 A1 | 6/2010 | Hu et al. |
| 2010/0146569 A1* | 6/2010 | Janardhan et al. ........ 725/98 |
| 2010/0189259 A1 | 7/2010 | Kaler |
| 2010/0250678 A1 | 9/2010 | Hu et al. |
| 2010/0262709 A1* | 10/2010 | Hiie et al. ............ 709/231 |
| 2010/0287272 A1 | 11/2010 | Berkey et al. |
| 2011/0004681 A1 | 1/2011 | Das et al. |
| 2011/0161417 A1 | 6/2011 | Le Scouarnec et al. |
| 2011/0307115 A1 | 12/2011 | Pereira et al. |
| 2012/0030333 A1 | 2/2012 | Hu et al. |
| 2012/0210014 A1 | 8/2012 | El-Beltagy |
| 2013/0091294 A1 | 4/2013 | El-Beltagy et al. |
| 2013/0132601 A1 | 5/2013 | El-Beltagy et al. |
| 2013/0132602 A1 | 5/2013 | El-Beltagy et al. |

OTHER PUBLICATIONS

Microsoft. (2002) Microsoft Computer Dictionary. Redmond, WA: Microsoft Corporation.*

Roverso, Roberto, et al. (Jan. 2011). On the feasibility of centrally-coordinated peer-to-peer live streaming. In Consumer Communications and Networking Conference (CCNC), 2011 IEEE (pp. 1061-1065). IEEE.*

International Search Report, Application No. PCT/EP2012/072411, Feb. 20, 2013.

Written Opinion of the International Searching Authority, Application No. PCT/EP2012/072411, Feb. 20, 2013.

International Search Report, Application No. PCT/EP2012/069509, Feb. 28, 2013.

Written Opinion of the International Searching Authority, Application No. PCT/EP2012/069509, Feb. 28, 2013.

Roverso et al., "On the Feasibility of Centrally-Coordinated Peer-to-Peer Live Streaming", *The 8th Annual IEEE Consumer Communications and Networking Conference—Special Session on Scalable Adaptive Multicast in P2P Overlays*, Jan. 9, 2011, pp. 1061-1065.

Small et al., "Scaling Laws and Tradeoffs in Peer-to-Peer Live Multimedia Streaming" *Multimedia '06 Proceedings of the 14th annual ACM international conference on Multimedia*, Jan. 2, 2006, pp. 539-548.

* cited by examiner

METHOD AND DEVICE FOR ARRANGING PEERS IN A LIVE STREAMING P2P NETWORK

TECHNICAL FIELD

The invention relates to a method of arranging peers in a P2P network and a device for arranging peers in a P2P network.

BACKGROUND

For live video streaming in a client-server approach, the video stream is downloaded from the streaming server (i.e. source) to the client. A video stream consists of a set of consecutive data pieces, or data subset, that the client periodically requests in order to play the video. A scalable live streaming service requires high streaming server bandwidth to satisfy an increasing number of clients over the Internet. In order to reduce the cost of the streaming server, peer-to-peer (P2P) live streaming has been developed. The basic concept of P2P live streaming is to make the clients, referred to as peers in this context, share the load with the streaming server.

P2P live streaming systems has gained a lot of interest in the recent years as it has the advantage of allowing a streaming source to broadcast e.g. a live video event to a large number of peers, without having to provide all the required bandwidth. This is done by making use of the peers' upload capacity to assist the streaming source in broadcasting the content to the peers.

P2P networks comprise any networks composed of entities that each provides access to a portion of their resources (e.g., processing capacity, disk storage, and/or bandwidth) to other entities. The P2P concept differs from traditional client/server architecture based networks where one or more entities (e.g., computers) are dedicated to serving the others in the network. Typically, entities in a P2P network run similar networking protocols and software. Applications for P2P networks are numerous and may for example comprise transporting and/or storing data on the Internet, such as video distribution for content owners.

Many approaches have been developed to efficiently make use of the upload capacity of the peers. These approaches can be divided into two main categories.

Tree-based systems are based on constructing one or more structured trees in an overlay network where peers at the top of each tree feed the peers below them. This approach works well when the peers do not join or leave the system at high frequency as data flow is achieved without any further messages between the peers. However, in a high churn environment, tree maintenance can be very costly and sometimes destruction and reconstruction of the tree(s) are necessary.

Mesh-based systems do not enforce a tree construction, or in other words peer connectivity does not form a specified overlay, and they are connected to each other in an unstructured manner. They exchange data through so called gossip communication or by sending data request messages to each other. A disadvantage with mesh-based systems is that they can have a long setup time, as nodes need to negotiate with each other to find peers. However, many systems use the mesh-based approach as it is very robust to high churn. In such systems each peer has a number of neighbours that it potentially downloads from and failure of any neighbour is thus not as critical as in tree-based approaches.

Although individual peers take decisions locally without a global view in the mesh-based approaches, they can still reach comparable savings to tree based approaches when peer churn is considered, mainly since they do not have to carry the heavy overhead of maintaining a view of the global connectivity structure.

In a decentralized P2P live streaming network, each peer has k neighbouring peers from which it can attempt to download data content. Thus, the peer will try to find a neighbouring peer that it can download from instead of downloading the data content from the streaming server. Given such a prior art overlay network, if the peers start streaming data content from the same point in time, all the peers will not find an uploading peer that has useful content. Hence, almost all the peers will download from the streaming server, which ultimately leads to minimal savings in streaming server bandwidth utilization.

SUMMARY

An object of various embodiments of the present invention is to solve or at least mitigate these problems in the art.

This object may be attained by the method and device for arranging peers in a P2P network in accordance with the independent claims; preferred embodiments are defined by the dependent claims.

To this end, a request is received from a peer entering the network to receive data content. Thereafter, a latency is determined with which the entering peer is to receive the data content with respect to a real-time playback point of the data content distributed by the streaming source. After the latency has been determined, the entering peer is provided with a plurality of randomly selected peers from which the requested data content can be downloaded with an expected probability depending on the determined latency. Thus, the entering peer is enabled to download, with the expected probability, the requested data content from a selected one of the randomly selected peers having a lower latency than that determined for the entering peer.

Hence, by carefully selecting an appropriate latency for the entering peer, the possibility of having the entering peer download from one of its neighbouring peers can be increased. Analogously, this decreases the risk of having a peer download the data content from the streaming source.

It is noted that the invention relates to all possible combinations of features recited in the claims. Further features of and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
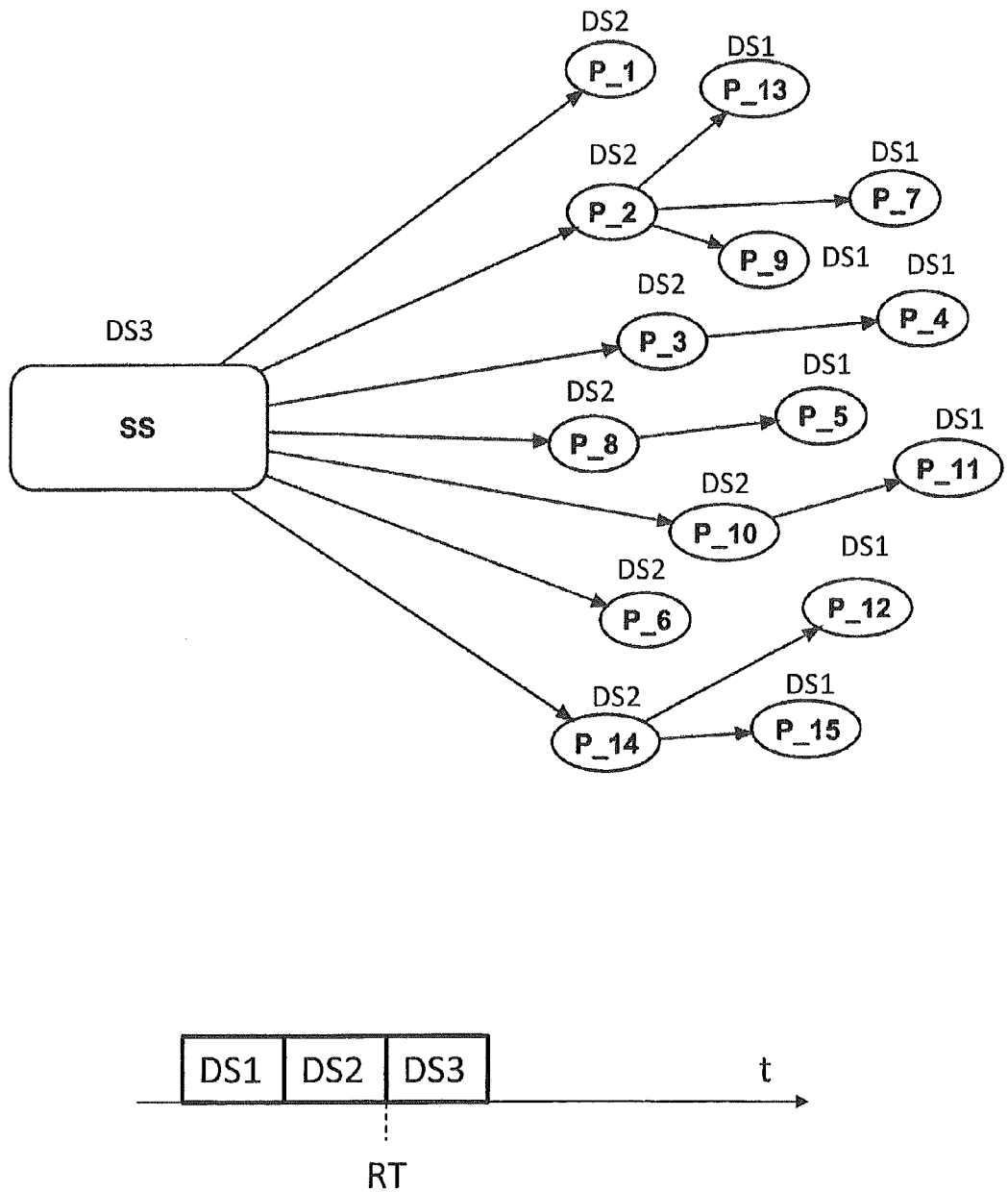
FIG. 1 illustrates data streaming in a prior art live streaming P2P network.

FIG. 1 shows a prior art P2P overlay network with peers $p_1$-$p_{15}$ randomly connected to a streaming server SS. The streaming server distributes data content divided into smaller pieces of data that are streamed to the network peers. Thus, the data content is divided into consecutive pieces of data referred to as data subsets throughout this application. This is illustrated in the lower section of FIG. 1, where the data content is divided into smaller data subsets DS1-DS3. Once the streaming source SS has "packeted" a data subset DS, it can be submitted to a peer, which starts playback of the data subset while the streaming source produces the next data subset. In FIG. 1, the streaming server uploads data subset DS1 to peers $p_1$, $p_2$, $p_3$, $p_6$, $p_8$, $p_{10}$ and $p_{14}$, wherein playback of DS1 resumes at each respective peer. At the same time, the streaming server produces data subset DS2, and once the peers $p_1$, $p_2$, $p_3$, $p_6$, $p_8$, $p_{10}$ and $p_{14}$ have effected a full playback of data subset DS1, it is stored in a playback buffer of the respective peer. The streaming server thus uploads data subset DS2 to the peers $p_1$, $p_2$, $p_3$, $p_6$, $p_8$, $p_{10}$ and $p_{14}$, while peer $p_2$ uploads the latest fully downloaded data subset DS1 to peers $p_7$, $p_9$ and $p_{13}$, peer $p_3$ uploads DS1 to peer $p_4$, and so on.

Hence, in such a prior art P2P live streaming network, each peer entering the network will ask a tracker (not shown) for the latest data subset to start streaming from as well as k random peers to be its neighbours. Then, the entering peer will turn to its neighbours for the latest subset of data, and if it finds the required data subset on any neighbouring peer, it will start streaming from that neighbouring peer. As has been explained in the above, due to network delay and asynchronicity, the entering peer will be delayed by at least the full duration of one data subset from its uploader and at least twice that from the streaming server on condition that the entering peer's uploader is delayed by at least the full duration of one data subset from the source. In other words, with respect to a real-time playback point RT of the data content distributed by the streaming source, the entering peer will have a latency of at least two data subsets, while its uploader will have a latency of at least one data subset. If the entering peer cannot find the latest data subset on one of its neighbouring peers, it will download it from the streaming server. As compared to a traditional client-server network, where the server distributes content to all clients in the network, savings in streaming server load of the P2P network in FIG. 1 is 8/15=0.53. That is, instead of streaming content to all 15 peers, the streaming server SS streams content to seven of the peers, which in their turn unload the server by streaming content to the remaining eight peers.

Figure 2A:
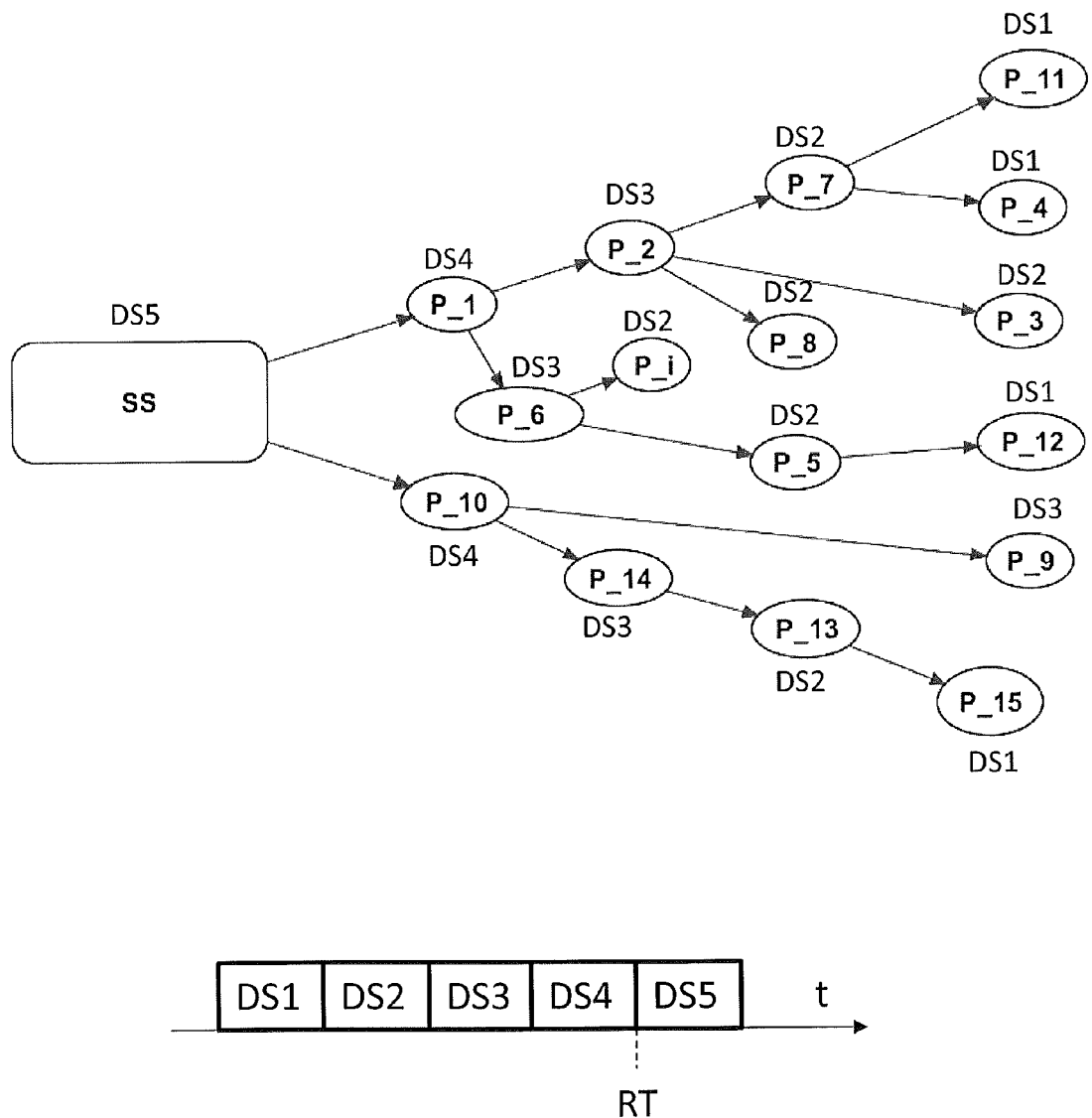
FIGS. 2a and b illustrate data streaming in a live streaming P2P network according to an embodiment of the present invention.

Now, with reference to FIG. 2a showing an embodiment of the present invention, a new peer $p_i$ is entering the network and requests the tracker to receive data content originally streamed from the streaming source SS. The tracker determines that the latency, with respect to a real-time playback point RT of the data content distributed by the streaming source, with which the entering peer is to receive the data content is $d_i$ time units, i.e. the entering peer will receive and be able to playback a data subset $d_i$ time units after the same data subset have been rendered in real-time by the streaming source. The tracker will then provide the entering peer with a list of randomly selected peers from which the data content can be downloaded. This list of peers is derived or sampled from a probability density function for the peer as a function of latency. Thus, the entering peer is enabled to download, from a selected subset of the listed peers having a lower latency than that determined for the entering peer, the data content with the determined latency $d_i$ with respect to the real-time playback point of the streaming source.

With reference again to FIG. 2a, the data subset which is rendered by the streaming source in real-time when a peer enters the network is DS5. Assuming for example that the determined latency $d_i$ is 3 units and expressed in a resolution of data subset durations, i.e. the determined latency is three full data subsets, and the list provided by the tracker to the entering peer $p_i$ comprises peers $p_2$, $p_5$, $p_6$, $p_7$ and $p_8$ in practice this number is substantially higher), the entering peer can find the required data subset DS2 at either peer $p_2$ or $p_6$, being the latest fully downloaded data subset stored in a playback buffer of $p_2$ and $p_6$, respectively. Hence, DS2 is the latest data subset that can be uploaded by peer $p_2$ and $p_6$. In this particular example, since peer $p_2$ is uploading to three other peers, it may be preferred that the entering peer downloads from $p_6$. It should be noted that the entering peer cannot download from either one of $p_5$, $p_7$ or $p_8$, since they all are rendering data subset DS2 at the moment peer $p_i$ is entering the network. Thus, the latest fully downloaded data subset stored in the respective playback buffer of $p_5$, $p_7$ and $p_8$, is data subset DS1.

As compared to a traditional client-server network, savings in streaming server load of the P2P network in FIG. 2a is 13/15=0.87. That is, instead of streaming content to all 15 peers; the streaming source SS streams content to two of the peers, which in their turn relieve the source from load by streaming content to the remaining 13 peers.

In the exemplified embodiments of the present invention, the determined latency with which an entering peer downloads data content with respect to a real-time playback point RT of the data content distributed by the streaming source is represented by time units equivalent to the duration of a data subset. As an example, if in a P2P network the duration of a distributed data subset is 300 ms, a latency of one unit implies that a peer downloads a data subset 300 ms after the same data subset has been rendered by the streaming source.

Figure 2B:
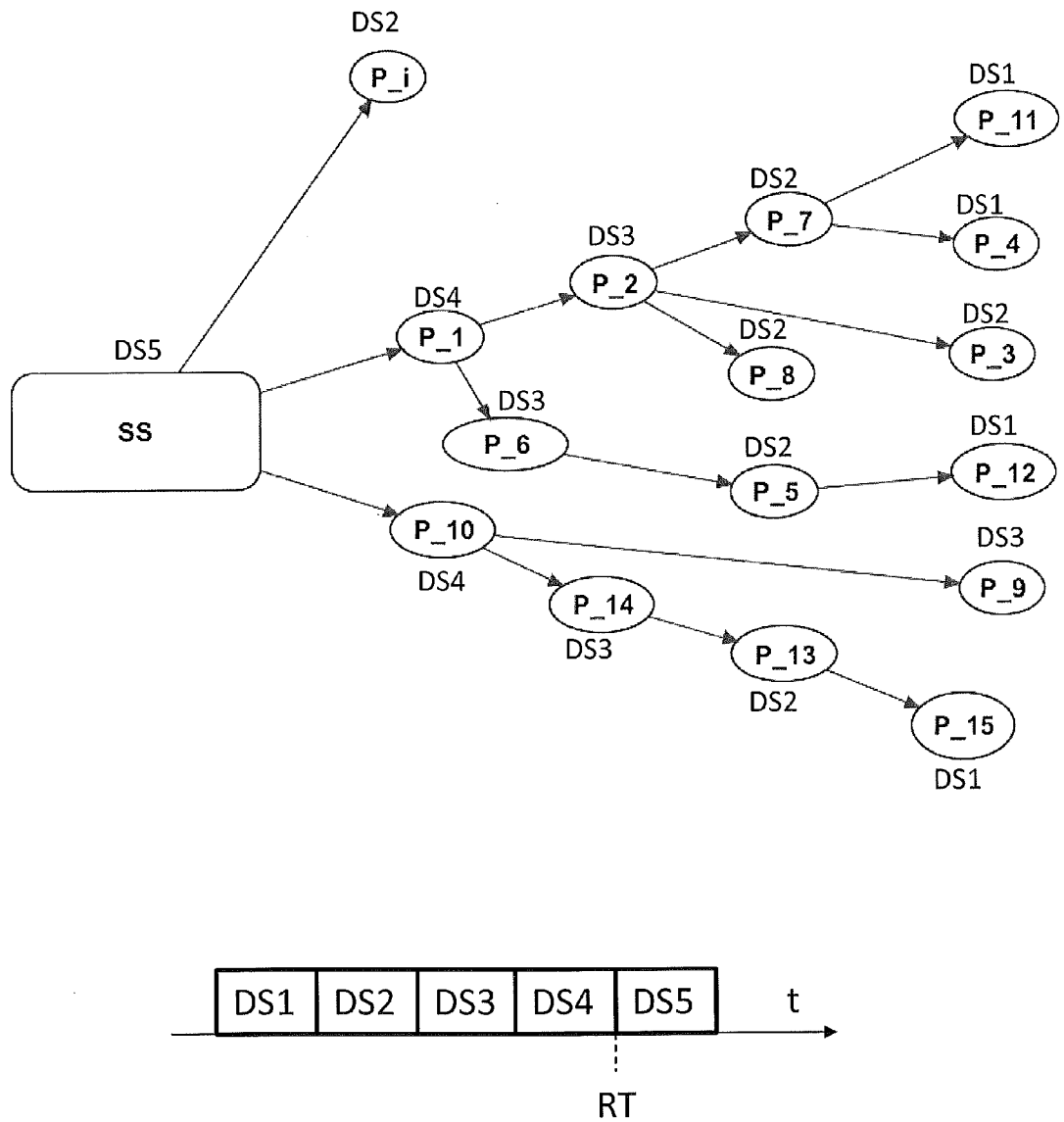

FIG. 2b illustrates another embodiment of the present invention, where the tracker again determines that the latency $d_i$ of the entering peer $p_i$ should be 3 units. In this particular example, the list provided by the tracker to the entering peer $p_i$ comprises peers $p_3$, $p_4$, $p_7$, $p_8$ and $p_{ii}$. In this case, with the determined latency of 3 units, the entering peer cannot find the required data subset DS2 at either of the listed peers. For peers $p_4$ and $p_{11}$, the latest fully downloaded data subset stored in the respective playback buffer is DS0, while peers $p_3$, $p_7$ and $p_8$ have DS1 as the latest fully downloaded data subset. Thus, none of the listed peers can upload the required data subset DS2 to the entering peer, which has as a consequence that the entering peer must turn to the streaming source for the required data subset.

Figure 3:
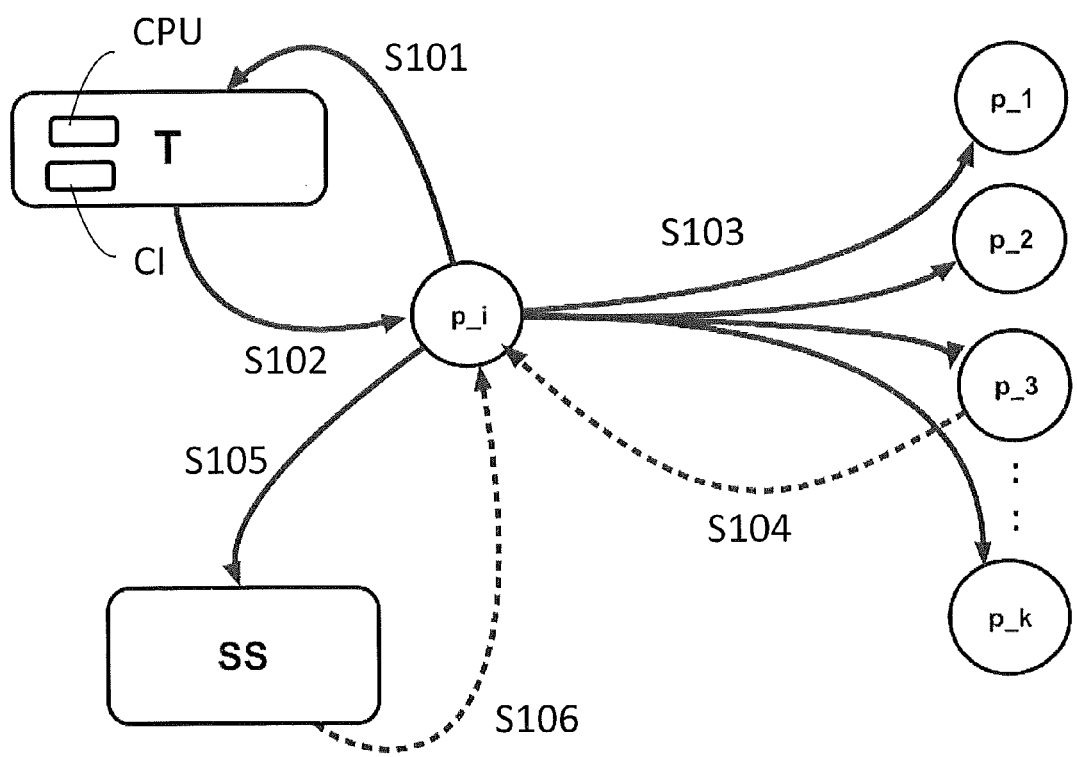
FIG. 3 illustrates the function of a tracker according to an embodiment of the present invention.

FIG. 3 illustrates a further embodiment of the invention combining the teachings set forth in connection to FIGS. 2a and 2b. Continuous lines denote request/reply messages, while dashed lines denote streaming channels. A new peer $p_i$ enters the network and requests the tracker T in step S101 via its communication interface CI to receive data content originally streamed from the streaming source SS. The tracker determines the latency with which the entering peer is to receive the data content with respect to the real-time playback point and provides in step S102 the entering peer with a list of k randomly selected peers from which the data content can be downloaded. Thus, the entering peer requests in step S103 the peers on the list to supply it with the latest subset of data given the determined latency for the entering peer. If there exists at least one peer out the k randomly selected peers which has a latency with respect to the real-time playing point that is lower than that determined for the entering peer, the requested data content will be uploaded in step S104 to the entering peer. In FIG. 3, peer $p_3$ uploads the requested data content to the entering peer $p_i$. Depending on how the latency for the entering peer is selected, the probability that a peer can upload the requested data content to the entering peer in step S104 can be increased. If no randomly selected peer exists which has a latency with respect to the real-time playing point that is lower than that determined for the entering peer, i.e. all k peers has a latency which is equal to or higher than that determined for the entering peer, the requested data content cannot be uploaded in step S104 to the entering peer. In that case, the entering peer will in step S105 turn to the streaming server SS for the requested data content, which in its turn will upload the requested data content to the entering peer in step S106. Analogously, depending on how the latency for the entering peer is selected, the probability that the streaming server will have to upload the requested data content to the entering peer in step S106 can be decreased. These probabilities will be discussed in detail later on in the detailed description.

In embodiments of the invention, the tracker of the present invention determines the delay $d_i$ when an entering peer is to receive the content data, with respect to a real-time playback point of the data content uploaded by the streaming source on the basis of statistical information. The behaviour of a P2P network in which the present invention is implemented is stochastic, which is based on currently streaming network peers. Thus, statistical information should be considered such that a probability distribution that represents the behaviour of peers in the P2P live streaming network can be formed. Given the probability distribution p(d) of the latency from the real-time playback point of the live data content at the streaming server, expected savings in the streaming server bandwidth load can be calculated. Thus, by setting a latency value which follows the distribution p(d) for each entering peer, the savings of the stream server will approach the expected savings calculated using the said distribution. Or to put it in another way: by determining an appropriate latency with which the entering peer is to download data content, the probability that a network peer can be found from which the entering peer can download requested data content can be increased. Thus, the savings in the streaming server bandwidth is directly related to the probability that a network peer can upload requested data content to the entering peer.

With reference to FIG. 3, the tracker T of embodiments of the present invention is typically a device equipped with one or more processing units CPU in the form of microprocessor(s) executing appropriate software stored in associated memory for procuring required functionality. However, other suitable devices with computing capabilities could be used, e.g. an application specific integrated circuit (ASIC), a field programmable gate array (FPGA), a complex programmable logic device (CPLD), etc., in order control the P2P system and determine latencies of peers in accordance with embodiments of the method according to the present invention, while executing appropriate downloadable software stored in a suitable storage area, such as a RAM, a Flash memory or a hard disk.

Figure 4:
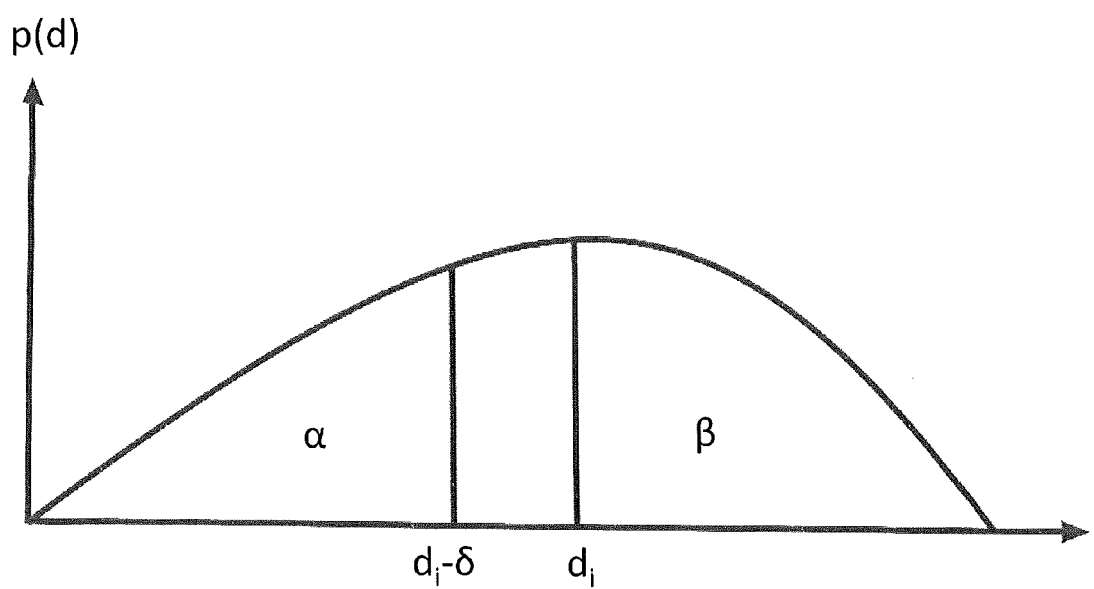
FIG. 4 illustrates a probability distribution of network peers latencies with respect to a real-time playback point of a streaming source according to an embodiment of the present invention.

Reference is made to FIG. 4, which shows an assumed shape for the distribution of the latency with respect to the real-time playback point in accordance with embodiments of the present invention. As the distribution of latency values is controlled by the tracker, a relationship between the expected savings and this distribution can be formulated. In embodiments of the present invention, any entering peer i, having k randomly selected neighbors and a certain latency $d_i$ with respect to the real-time playback point determined by the tracker will search among its neighbors for the requested data content, i.e. the data subset which was rendered in real-time at the streaming source $d_i$ data subsets earlier, see FIGS. 2a and 2b. If it does not find the particular data subset, it will request it from the streaming server incurring a cost to the streaming server bandwidth. This undesired situation occurs when the latest fully downloaded data subset at each one of the k neighbors have a latency which is equal to or more than that determined for the entering peer, i.e. fall in region β or the region defined by $d_i-\delta$ to $d_i$ of the distribution p(d).

On the other hand, if one of the k neighbouring peers has a latency that falls in the region α (and has enough bandwidth), then this peer can upload to the entering peer from the requested data subset. Again with reference to FIGS. 2a and 2b, it should be noted that region α is limited by $d_i-\delta$, where δ typically amounts to the duration of one data subset. That is, if the latency of the entering peer is determined to be three data subsets, it can download the requested data subset from a peer having a latency of two data subsets from the real-time playback point. Hence, an entering peer can only download from any neighbouring peer that precedes it by at least δ. Consequently, the probability $P_{di}$ for an entering peer that a randomly selected neighbouring peer is in the region α is simply the cumulative distribution function (cdf) value of the random variable d at the value $d_i-\delta$:

$$P_{\alpha_i} = cdf(d = d_i - \delta) = \int_0^{d_i-\delta} p(x)dx \quad (1)$$

Thus, in an embodiment of the invention, the latency $d_i$ of the entering peer is determined by the tracker using the teachings set forth in Equation (1) such that the requested data content can be downloaded from one of the k randomly selected peers with a sufficiently high probability. Hence, by carefully selecting an appropriate latency for the entering peer, the possibility of having the entering peer download from one of its k neighbouring peers can be increased (or decreased, if required). A cost of having the entering peer downloading from a neighbouring peer with a higher probability is that the latency experienced by the entering peer increases. Thus, if for a given P2P live streaming network the probability of successful download from a neighbouring peer already is high, the latency may be selected by the tracker to be low with a still high download probability.

Further, this may be stipulated by a predetermined threshold value which the probability should exceed for the chance that the requested data content could be downloaded from a neighbouring peer should be considered great enough.

Each peer will be given a list of k randomly selected neighbouring peers, as described hereinabove, in order to ensure that the determined latencies from the real-time playback point will concur with the probability distribution p(d) and thus do not have any bias. Further as has been described in the above, an entering peer will download from the streaming server when the respective latest fully downloaded data subset of each peer among the k neighbouring peers is older than the data subset that the entering peer is requesting. This situation occurs in FIG. 2b, where the tracker determines that the latency $d_i$ of the entering peer $p_i$ should be 3 data subsets and the list provided by the tracker to the entering peer $p_i$ comprises peers $p_3$, $p_4$, $p_7$, $p_8$ and $p_{11}$. In this case, with the determined latency of 3 units, the entering peer cannot find the required data subset DS2 at either of the listed peers. For peers $p_4$ and $p_{11}$, the latest fully downloaded data subset stored in the respective playback buffer is DS0, while peers $p_3$, $p_7$ and $p_8$ have DS1 as the latest fully downloaded data subset. Thus, none of the listed peers can upload the required data subset DS2 to the entering peer, since the available data subsets DS1 and DS0 both are older than the requested data subset DS2, which has as a consequence that the entering peer must turn to the streaming source for the required data subset. With reference to FIG. 4, this occurs if all k randomly selected neighbouring peers have a higher latency than that determined for the entering peer, i.e. fall in region β of the probability distribution p(d).

In a further embodiment of the present invention, the probability that all the k neighbouring peers will be in the region β can be expressed as a binomial experiment, where the probability of attaining zero success trials out of a total number k of trials is determined. By considering success probability as the probability of finding one neighbouring peer that falls in the region α, the probability $P_F$ of finding zero neighbouring peers that belong to region α out of k neighbouring peers can be expressed as a binomial experiment with x=0 as follows:

$$P_F(d_i) = Pr(X=0 | k, P_{\alpha_1}) = \binom{k}{0} P^0 (1-P_{\alpha_1})^k$$

$$P_F(d_i) = (1-P_{\alpha_1})^k \quad (2),$$

Thus, $P_F(d_i)$ expresses the probability that a downloading peer with a determined latency $d_i$ will have to stream required data content from the streaming server since no neighbouring peer out of the k randomly selected peers is located in region α of FIG. 4. Analogously, the probability that an entering peer with latency $d_i$ will find at least one neighbouring peer out of the k randomly selected peers in region α (from which it may be download the requested data content) can be expressed as $1-P_F(d_i)$. This embodiment presents a simple model which the tracker can use to determine latency $d_i$ for an entering peer such that data content can be streamed from a neighbouring peer with a certain probability.

However, this does not take into account finite bandwidth capacity of each one of the network peers. A situation may occur where an entering peer with latency $d_i$ has found one or more neighbouring peers out of the k randomly selected peers in region α, but the neighbouring peers cannot upload to the entering peer due to limitations in bandwidth capacity. In an embodiment of the present invention described in the following, the tracker takes into account the finite bandwidth capacity of the network peers.

For practical purposes, a discrete probability distribution p(d) will be used since practically, the latency from the real-time playback point is expressed as discrete values, i.e. in data subset durations. Thus, the latencies take on discrete values $[d_1, d_2, d_3, \ldots]$, where $d_{n+1} - d_n = \delta$ for all n. A discrete probability distribution implies that the expected number of peers with latency $d_i$ are $N_i = p(d_i)N$. For any latency $d_j$ from the real-time playing point, the number of download requests from peers with latency $d_i$ is:

$$R_{ij} = \begin{cases} N_{pi} \dfrac{p(d_j)}{P_{\alpha_i}} & \text{if } d_j \leq d_i - \delta \\ 0 & \text{otherwise} \end{cases} \quad (3)$$

Where $N_{pi} = (1-P_F(d_i))N_i$ is the expected number of peers with latency $d_i$ that will attempt to download from peers in region α. The reason only a subset $N_{pi}$ of all peers $N_i$ having a latency $d_i$ will make a successful attempt to download from other peers in region α is that there is a probability that peers with latency $d_i$ will have no neighbouring peers in α and hence will have to download from the streaming source.

The total number of download requests that neighbouring peers make to peers with latency $d_j$ is thus:

$$R_j = \sum_{i=j+1}^{\infty} R_{ij}$$

Figure 5:
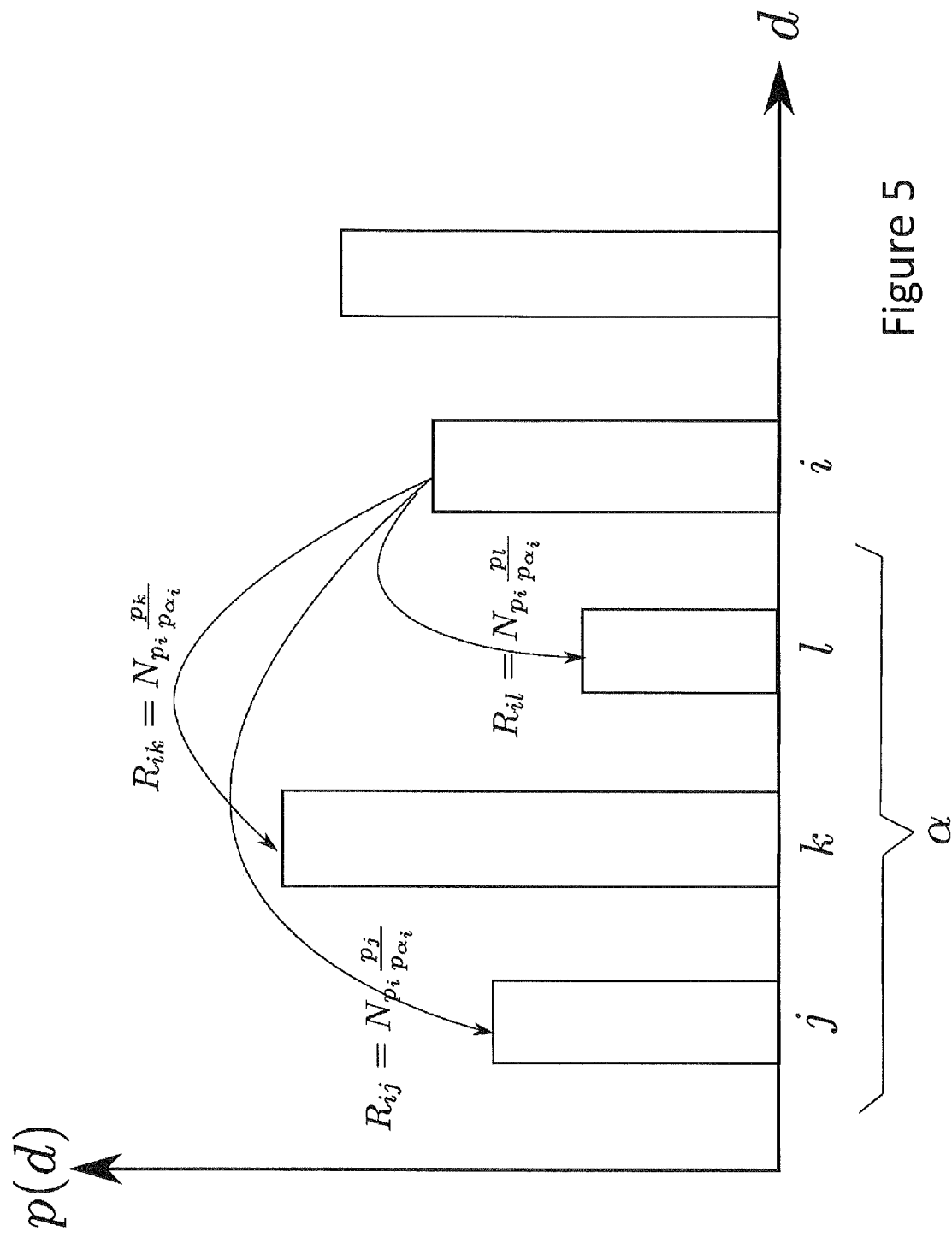
FIG. 5 illustrates an embodiment of the present invention where peers with latency $d_i$ send requests to neighbouring peers in region α.

FIG. 5 shows an example where peers with latency $d_i$ send requests to neighbouring peers in region α, and it illustrates that no requests will be sent to neighbours in the β region (which situation is represented by the second condition of Equation 3).

In order to find how many of these requests will be satisfied given that the number of peers with latency $d_j$ is expressed as $N_j$, each of them having a capacity of E(u) simultaneous uploads, the probability that a peer with latency $d_j$ will respond to l requests for download from the total number $R_j$ of download requests as:

$$B_j(l) = \binom{R_j}{l} \left(\frac{1}{N_j}\right)^l \left(1 - \frac{1}{N_j}\right)^{R_j - l} \quad (4)$$

where E(u) is the average number of simultaneous uploads per peer and is determined by bandwidth distribution $p_{bw}$ and the streaming bitrate br. The average number of simultaneous uploads per peer is thus calculated as $E(u) = E(p_{bw}/br)$. As an example, if a given peer is assigned a bandwidth of 1 Mb/s and the streaming bit rate is 200 kB/s, the peer can simultaneously upload to five other peers.

$B_j(l)$ determines the share of peers with latency $d_j$ that will receive l download requests. For $l \leq E(u)$, the number of successful requests will be $l \times B_j(l) \times N_j$, while for $l > E(u)$, the number of successful requests will be $E(u) \times B_j(l) \times N_j$. Thus, peers with latency $d_j$ receive $R_j$ download requests, and each request will fall on one of the plurality $N_j$ of peers randomly, wherein the distribution of download requests can be modelled as a binomial distribution.

Therefore, the expected number of successful responses that peers with latency $d_j$ make to download requests from neighbouring peers (i.e. the load on peers with latency $d_j$) is:

$$L_j = \left( \sum_{l=1}^{E(u)} lB_j(l) + E(u)\left(1 - \sum_{l=0}^{E(u)} B_j(l)\right) \right) N_j, \quad (5)$$

and hence the expected number of peers streaming from the P2P network is the total number of successful downloads:

$$L = \sum_{j=0}^{\infty} L_j.$$

The probability that a download request which a neighbouring peer makes to peers with latency $d_j$ is successful can be calculated as the ratio between the expected number of successful responses and the total number of download requests, i.e. $L_j/R_j$.

Consequently, the probability that a download request from a peer with latency $d_j$ will fall in region α is $(1-P_F(d_i))$, i.e. the probability that a peer with latency $d_i$ will find at least one neighbouring peer out of the k randomly selected peers in region α from which it may be download the requested data content can be expressed as $1-P_F(d_j)$. The probability that one of those requests to peers in region α actually will go to peers having the particular latency $d_j$ is $p(d_j)/P\alpha_i$ (deducted from Equation 3 which defines this probability for a number $N_i$ of peers with latency $d_i$). These are modelled as independent probabilities, and the probability that a peer having latency $d_i$ will be able to download content from a neighbouring peer having a particular latency of $d_j$ (given the bandwidth limitations) can be expressed as a product of these three probabilities. It then follows that the probability that a peer having a latency makes a successful download from the P2P network, i.e. a download from any peer having a latency lower than $d_i$, will be expressed as a sum of probabilities:

$$P_s(d_i) = (1 - P_F(d_i)) \sum_{j=0}^{j=i-1} \frac{L_j}{R_j} \frac{p(d_j)}{P_{\alpha_i}}, \quad (6)$$

Hence, the summation covers all peers having a latency lower than $d_i$ and not only peers having a particular latency of $d_j$.

Expected streaming source savings will relate to the probability of successful download by each peer in the network:

$$\text{savings} = \sum_{i=0}^{\infty} P_s(d_i) p(d_i). \quad (7)$$

The savings can however be expressed in a simpler manner as the ratio of successful downloads to the peers in the network and the total number of peers in the network, i.e.:

$$\text{savings} = \frac{L}{N}. \quad (8)$$

This form for calculating the savings is conceptually simpler and computationally more efficient. Both Equations (7) and (8) yield the same result.

To recapitulate this particular embodiment of the present invention, the situation where a downloading peer with a determined latency $d_i$ will have to stream required data content from the streaming server occurs if:

(a) no neighbouring peer out of the k randomly selected peers is located in region α, i.e. no neighbouring peer has a latency of $d_i-\delta$ or less, or (b) one or more neighbouring peers out of the k randomly selected peers are located in region α, but the neighbouring peers cannot upload due to limitations in bandwidth capacity.

To put it in another way, even though neighbouring peers can be located in region α illustrated in FIG. 4, the located neighbouring peers may be restrained from effecting an upload to the requesting peer due to bandwidth limitations. Equation 6 set forth in the above takes these bandwidth limitations into account and calculates $P_s(d_i)$, i.e. the probability that a peer having a latency $d_i$ makes a successful download from the P2P network.

Thus, in this embodiment of the present invention, the latency $d_i$ of the entering peer is determined by the tracker using the teachings set forth in Equation (6) such that the requested data content can be downloaded from one of the k randomly selected peers with a sufficiently high probability. In contrast to previously described embodiments, this particular embodiment takes limitations in streaming bandwidth capacity into account.

In the previous embodiment of the present invention, the tracker did not take into account a situation where a joint probability of latency and bandwidth p(u, d) exists. If the latency and bandwidth is modelled as joint probability variables, it is possible to attain even better results in determining latency of an entering peer. The probability distribution of latency $d_i$ from the real-time playback point is the sum over u of the joint probability p(u, d) as follows:

$$p(d_i) = \sum_u p(u, d_i)$$

where u has been described in the above as the number of simultaneous uploads for a peer and is determined by bandwidth distribution $p_{bw}$ and the streaming bitrate br. The number of simultaneous uploads for a peer is $u=p_{bw}/\text{br}$.

In this more elaborate embodiment, the tracker will take into account the fact that peers requesting data content downloads may have different bandwidth u, i.e. different peers in the P2P network may be able to effect different numbers of uploads. With reference e.g. to the embodiments illustrated in FIGS. 2 and 3, the request received by the tracker will thus further contain the upload capacity of the uploading peer.

The number of download requests from peers with latency $d_i$ to peers with latency $d_j$ and upload capacity u is:

$$R_{iju} = \begin{cases} N_{P_i} \dfrac{p(u, d_j)}{P_{\alpha_i}} & \text{if } j \le i - \delta \\ 0 & \text{otherwise} \end{cases}$$

Similarly, the total number of download requests that neighbouring peers make to peers with latency $d_j$ and bandwidth u is:

$$R_{ju} = \sum_{i=j+1}^{\infty} R_{iju}$$

In order to find how many of these requests will be satisfied given that the number of peers with latency $d_j$ and upload capacity u is expressed as $N_{ju}$, the probability that a peer with latency $d_j$ and upload capacity u will respond to l requests for download from the total number $R_{ju}$ of download requests as:

$$B_{ju}(l) = \binom{R_{ju}}{l}\left(\frac{1}{N_{ju}}\right)^l\left(1 - \frac{1}{N_{ju}}\right)^{R_{ju}-l}$$

where $N_{ju}=p(u, j)N$ is the expected number of peers with latency $d_j$ and upload capacity u. Therefore, the expected number of successful responses that peers with latency $d_j$ and upload capacity u make to download requests from neighbouring peers (i.e. the load on peers with latency $d_j$ and upload capacity u) is:

$$L_{ju} = \left(\sum_{l=1}^{u} lB_{ju}(l) + u\left(1 - \sum_{l=0}^{u} B_{ju}(l)\right)\right)N_{ju}$$

and hence the expected number of peers streaming from the P2P network is the total number of successful downloads:

$$L = \sum_{j=0}^{\infty} \sum_{u} L_{ju}$$

In analogy with the reasoning previously set forth in connection to Equation 6, the probability that a peer with a latency of $d_i$ makes a successful download from the P2P network can now be expressed as:

$$P_s(d_i) = (1 - P_F(d_i))\sum_{u}\sum_{j=0}^{j=i-1}\frac{L_{ju}}{R_{ju}}\frac{p(u,d_j)}{P_{a_i}}, \quad (9)$$

and the savings will be expressed as in Equations (8) or (7).

In yet further embodiments of the present invention, the previously discussed relationship between latency distribution p(d) on the one hand and probability of having an entering peer upload from a peer having a latency less than that determined for the entering peer or savings on the other can be exploited in order to optimize the latency distribution to achieve highest possible probability that the entering peer streams data content from a suitable network peer.

This is done by considering the expected streaming server savings as a measure for evaluating the distribution p(d). After finding an optimal distribution by using a known evolutionary optimization algorithm, each peer will be assigned a latency with respect to the real-time playback point of the streaming server based on the optimal distribution simply by having the tracker sample latency values from the optimal distribution and assigning them to the peers. Determination of the optimal distribution takes the previously mentioned average number $E(u_i)$ of simultaneous uploads per peer into account. In an embodiment of the present invention, changes in $E(u_i)$ are considered and used to adapt p(d) to keep it optimized for the periodical changes in the P2P network.

In a first embodiment for optimizing, the latency distribution is assumed to follow an established distribution, for example a Poisson distribution. As the shape of standard distributions is affected by its parameters, it is only necessary to consider the space of the values of these parameters. If it is assumed that the random latency variable d follows a Poisson distribution, then the parameter $\lambda$ of this distribution should be optimized.

$$p(d | \lambda) = \frac{\lambda^d e^{-\lambda}}{d!}, d = 0, 1, 2, \ldots$$

Figure 6:
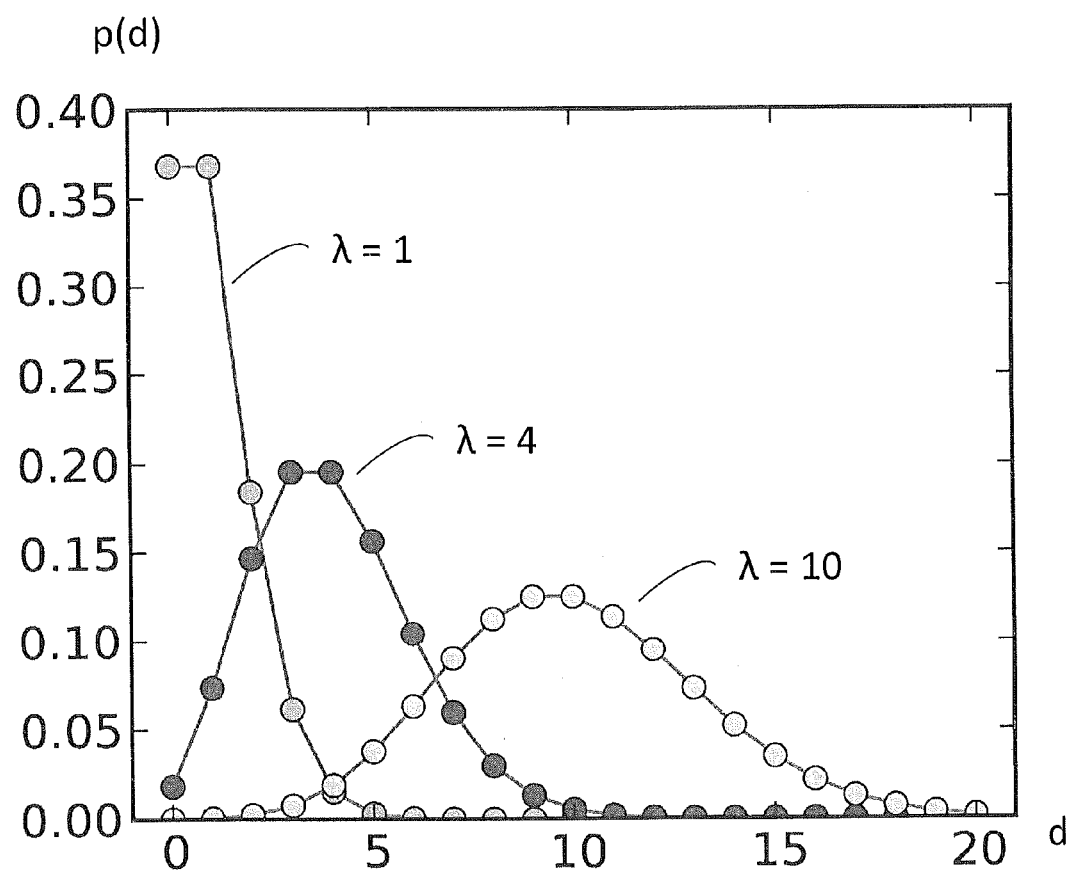
FIG. 6 illustrates a Poisson distribution used to model distribution of network peer latencies according to an embodiment of the present invention.

As is evident from FIG. 6, for a given latency $d_i$ determined by the tracker for an entering peer, the parameter $\lambda$ can be varied until a maximum probability value is found. Hence, maximizing the probability that the entering peer will upload requested data content from a network peer is equivalent to maximizing the savings in streaming server bandwidth load. For instance, in the exemplifying Poisson distribution illustrated in FIG. 6, for a determined latency $d_i=10$, the probability will be maximized for $\lambda=10$.

Figure 7:
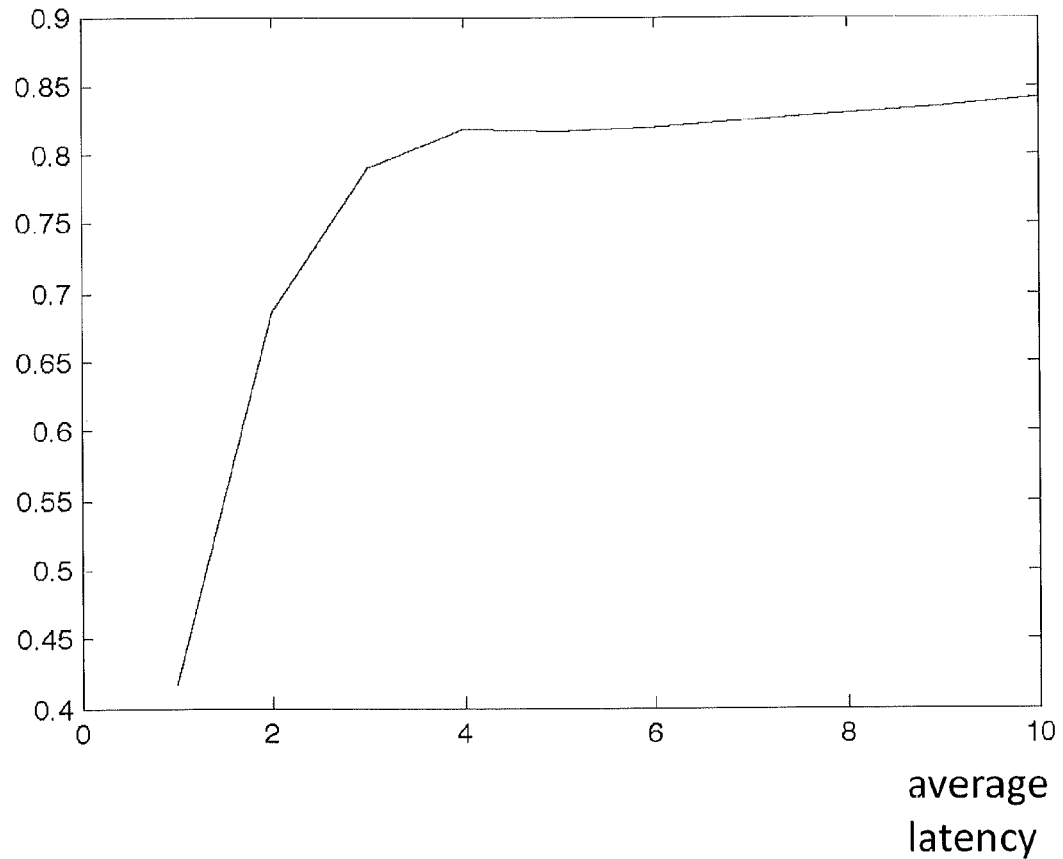
FIG. 7 illustrates streaming source bandwidth savings according to an embodiment of the present invention.

Before the shape of the distribution is optimized by, the number k of randomly selected neighbouring peers and the value of $E(u_i)$, i.e. the average number of simultaneous uploads per peer, should be set in an optimization engine which manages the optimization of the distribution $p(d|\lambda)$. After finding a near optimal value for $\lambda$ that maximizes the expected streaming server savings, by running a genetic algorithm (GA) on the space of $\lambda$, the tracker can then start using this optimal distribution for sampling the values of latency $d_i$ for the entering peer $p_i$. FIG. 7 illustrates the streaming source load savings for different values of $\lambda$ assuming that the tracker will provide the entering peer with a list of k=50 randomly selected neighbouring peers and $E(u_i)=3$. With these particular input numbers, the system will end up with about 82% expected savings. The x-axis represents peer latency.

Figure 8:
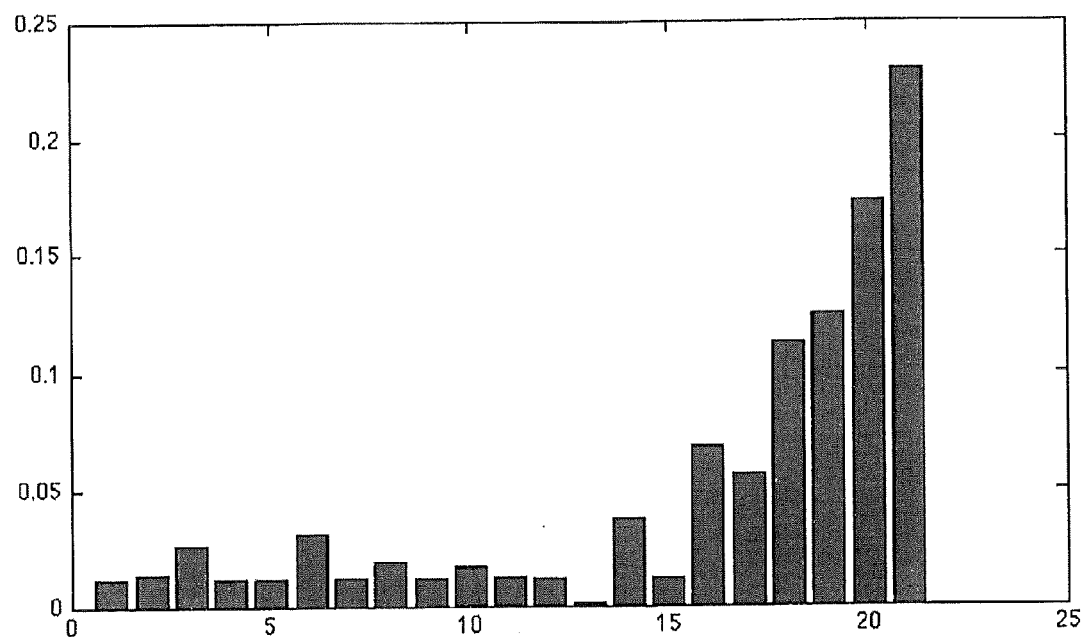
FIG. 8 illustrates a histogram representation of network peer latencies according to an embodiment of the present invention.

In another embodiment of the present invention, it is assumed that the latency distribution p(d) does not follow a predefined distribution but should be optimized as a histogram of probabilities. This is useful since the distribution shape is not constrained to follow a specific distribution but rather makes is free to have any possible shape. In this context it is assumed that the maximum number of bars in the histogram, i.e. the maximum possible latencies di, is Dmax. Thus, the target histogram representation will have only Dmax bars (referred to as frequency values). In FIG. 8, Dmax is selected to be 21, Each bar can attain values in the interval [0; 1], which means that the search space of the optimization will contain 21 decision variables. Since the histogram frequencies must add up to 1 (because of the constraint that this must be a probability distribution), a good optimization algorithm which is capable of handling these constraints is the genetic algorithm (GA). Having the same settings used in the Poisson shape optimization illustrated in FIG. 7, i.e. k=50 and E(ui) =3, the optimal histogram is shown in FIG. 8 with expected savings of about 85%.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of arranging peers in a P2P network comprising a streaming source and a plurality of peers, the method comprising:
   receiving a request from a peer entering the network to receive data content;
   determining, with respect to a real-time playback point of the data content distributed by the streaming source, a latency with which the entering peer is to receive the data content, said latency being derived from a determined probability distribution for the latencies with which the network peers receive data content distributed by the streaming source;
   arranging the entering peer in the P2P network according to the determined latency; and
   providing the entering peer with a plurality of randomly selected peers from which the requested data content can be downloaded with an expected probability depending on the determined latency,
   wherein the entering peer is enabled to download, with the expected probability, the requested data content from a selected one of said plurality of randomly selected peers having a lower latency than that determined for the entering peer, and
   wherein the determined probability distribution for the latencies with which the network peers receive data content distributed by the streaming source is based on a distribution level of the network peers in the P2P network.

2. The method according to claim 1, wherein the step of determining the latency for the entering peer comprises:
   randomly selecting a latency value from a plurality of latency values being lower than a predetermined maximum allowed latency with respect to the streaming source.

3. The method according to claim 1, wherein the step of determining the latency for the entering peer comprises:
   determining the probability that none of the plurality of randomly selected peers will have a latency which is lower than that determined for the entering peer by formulating a binomial experiment, where zero successes are defined in a number of trials equal to the number of randomly selected peers; and
   determining the probability that at least one of the plurality of randomly selected peers has a latency, with respect to a real-time playback point of the data content distributed by the streaming source, which is lower than that determined for the entering peer, by subtracting from 1 the probability that none of the plurality or randomly selected peers will have a latency which is lower than that determined for the entering peer.

4. The method according to claim 1, further comprising the steps of:
   taking into account bandwidth capacity of the plurality of randomly selected peers, and
   determining the probability that the entering peer is capable of downloading the requested data content from a selected one of the plurality of randomly selected peers on the basis of determined bandwidth capacity of the peers.

5. The method according to claim 4, wherein the probability that the entering peer is capable of downloading the requested data content from a selected one of the plurality of randomly selected peers is determined as the product of:
   the probability that the entering peer makes a successful download of content from a selected one of the plurality of randomly selected peers, which is determined by calculating the ratio between expected number of successful responses and total number of download requests from network peers; and
   the probability that at least one of the plurality of randomly selected peers has a latency which is lower than that determined for the entering peer and that a download request will go to any of said peers having a latency lower than that determined for the entering peer.

6. The method according to claim 4, wherein the step of taking into account bandwidth capacity of the plurality of randomly selected peers comprises:
   modelling the latency and bandwidth capacity of the plurality of randomly selected peers as joint probability variables; and the probability that the entering peer is capable of downloading the requested data content from a selected one of the plurality of randomly selected peers is determined on the basis of the joint probability of the latency and bandwidth capacity.

7. The method according to claim 6, wherein the probability that the entering peer is capable of downloading the requested data content from a selected one of the plurality of randomly selected peers is determined as the product of:
   the probability that the entering peer makes a successful download of content from a selected one of the plurality of randomly selected peers having a particular upload capacity out of a plurality of possible upload capacities, which is determined by calculating the ratio between expected number of successful responses and total number of download requests from network peers; and
   the probability that at least one of the plurality of randomly selected peers has a latency which is lower than that determined for the entering peer and that a download request will go to any of said at least one peers having a latency lower than that determined for the entering peer.

8. The method according to claim 1, wherein the step of determining the latency for the entering peer comprises:
   determining a probability distribution for the latencies with which the network peers receive data content distributed by the streaming source;
   optimizing a parameter of said probability distribution using an evolutionary optimization algorithm for all possible latencies, thereby maximizing the probability that the entering peer is capable of downloading the requested data content from a selected one of the plurality of randomly selected peers having a latency, lower than that determined for the entering peer.

9. The method according to claim 8, wherein the probability distribution is a Poisson distribution and the parameter to be optimized is the Poisson distribution parameter $\lambda$.

10. The method according to claim 1, wherein the step of determining the latency for the entering peer comprises:
    determining a histogram of probabilities for the latencies with which the network peers receive data content distributed by the streaming source;
    optimizing the histogram using an evolutionary optimization algorithm for all possible latencies, thereby maximizing the probability that the entering peer is capable of downloading the requested data content from a selected one of the plurality of randomly selected peers having a latency, lower than that determined for the entering peer.

11. The method according to claim 8, wherein the evolutionary optimization algorithm used is a genetic algorithm (GA).

12. A device for arranging a peer in a P2P network comprising a streaming source and a plurality of peers, the device comprising:

a processing unit; and a communication interface, wherein
said communication interface being arranged to receive a request from a peer entering the network to receive data content;
said processing unit being arranged to determine, with respect to a real-time playback point of the data content distributed by the streaming source, a latency with which the entering peer is to receive the data content;
said latency being derived from a determined probability distribution for the latencies with which the network peers receive data content distributed by the streaming source;
arranging the entering peer in the P2P network according to the determined latency; and
said communication interface being arranged to provide the entering peer with a plurality of randomly selected peers from which the requested data content can be downloaded with an expected probability depending on the determined latency,
wherein the entering peer is enabled to download, with the expected probability, the requested data content from a selected one of said plurality of randomly selected peers having a lower latency than that determined for the entering peer, and
wherein the determined probability distribution for the latencies with which the network peers receive data content distributed by the streaming source is based on a distribution level of the network peers in the P2P network.

13. The device according to claim 12, said processing unit further being arranged to determine the latency for the entering peer by:
randomly selecting a latency value from a plurality of latency values being lower than a predetermined maximum allowed latency with respect to the streaming source.

14. The device according to claim 13, said processing unit further being arranged to determine the latency for the entering peer by:
determining the probability that none of the plurality of randomly selected peers will have a latency which is lower than that determined for the entering peer by formulating a binomial experiment, where zero successes are defined in a number of trials equal to the number of randomly selected peers; and
determining the probability that at least one of the plurality of randomly selected peers has a latency, with respect to a real-time playback point of the data content distributed by the streaming source, which is lower than that determined for the entering peer, by subtracting from 1 the probability that none of the plurality or randomly selected peers will have a latency which is lower than that determined for the entering peer.

15. The device according to claim 12, said processing unit further being arranged to:
take into account bandwidth capacity of the plurality of randomly selected peers, and
determine the probability that the entering peer is capable of downloading the requested data content from a selected one of the plurality of randomly selected peers on the basis of determined bandwidth capacity of the peers.

16. The device according to claim 15, said processing unit being arranged to determine the probability that the entering peer is capable of downloading the requested data content from a selected one of the plurality of randomly selected peers as the product of:
the probability that the entering peer makes a successful download of content from a selected one of the plurality of randomly selected peers, which is determined by calculating the ratio between expected number of successful responses and total number of download requests from network peers; and
the probability that at least one of the plurality of randomly selected peers has a latency which is lower than that determined for the entering peer and that a download request will go to any of said at least one peers having a latency lower than that determined for the entering peer.

17. The device according to claim 15, said processing unit being arranged to take into account bandwidth capacity of the plurality of randomly selected peers by:
modelling the latency and bandwidth capacity of the plurality of randomly selected peers as joint probability variables; and the probability that the entering peer is capable of downloading the requested data content from a selected one of the plurality of randomly selected peers is determined on the basis of the joint probability of the latency and bandwidth capacity.

18. The device according to claim 17, wherein the processing unit is arranged to determine probability that the entering peer is capable of downloading the requested data content from a selected one of the plurality of randomly selected peers as the product of:
the probability that the entering peer makes a successful download of content from a selected one of the plurality of randomly selected peers having a particular upload capacity out of a plurality of possible upload capacities, which is determined by calculating the ratio between expected number of successful responses and total number of download requests from network peers; and
the probability that at least one of the plurality of randomly selected peers has a latency which is lower than that determined for the entering peer and that a download request will go to any of said peers having a latency lower than that determined for the entering peer.

19. The device according to claim 12, said processing unit further being arranged to determine the latency for the entering peer by:
determining a probability distribution for the latencies with which the network peers receive data content distributed by the streaming source; and
optimizing a parameter of said probability distribution using an evolutionary optimization algorithm for all possible latencies, thereby maximizing the probability that the entering peer is capable of downloading the requested data content from a selected one of the plurality of randomly selected peers having a latency, lower than that determined for the entering peer.

20. A computer program product comprising computer-executable components for causing a device to perform the steps recited in claim 1 when the computer executable components are run on a processing unit included in the device.

21. The method according to claim 1, further comprising:
determining that the entering peer is not able to download from any of the plurality of randomly selected peers; and
configuring the entering peer to download from the streaming source, in response to the determining that the entering peer is not able to download from any of the plurality of randomly selected peers.

22. The device according to claim 12, said processing unit further being arranged to:
- determine that the entering peer is not able to download from any of the plurality of randomly selected peers; and
- configure the entering peer to download from the streaming source, in response to determining that the entering peer is not able to download from any of the plurality of randomly selected peers.

23. The method according to claim 1, wherein the expected probability with which the entering peer is enabled to download is determined based on a cumulative distribution function (cdf) associated with the latency of the entering peer and an expected duration to receive by the entering peer one data subset from the stream source.

24. The device according to claim 12, wherein the expected probability with which the entering peer is enabled to download is determined based on a cumulative distribution function (cdf) associated with the latency of the entering peer and an expected duration to receive by the entering peer one data subset from the stream source.

25. The method according to claim 1, wherein the latency is determined based on a duration of one or more data subsets that comprise data content divided into consecutive pieces of data.

26. The device according to claim 12, wherein the latency is determined based on a duration of one or more data subsets that comprise data content divided into consecutive pieces of data.

* * * * *